United States Patent [19]

Hoshiyama

[11] Patent Number: 5,812,265

[45] Date of Patent: Sep. 22, 1998

[54] APPARATUS FOR MEASURING DIMENSION OF ARTICLE AND SCALE TO BE USED IN THE SAME

[75] Inventor: Hiroki Hoshiyama, Shizuoka, Japan

[73] Assignee: Japan EM Co., Ltd., Shizuoka-Ken, Japan

[21] Appl. No.: 886,212

[22] Filed: Jul. 1, 1997

Related U.S. Application Data

[63] Continuation of Ser. No. 453,525, May 30, 1995, abandoned.

[30] Foreign Application Priority Data

| May 31, 1994 | [JP] | Japan | 6-141131 |
| Jun. 21, 1994 | [JP] | Japan | 6-139085 |
| Jun. 28, 1994 | [JP] | Japan | 6-146531 |

[51] Int. Cl.$^6$ .................................................. G01B 11/00
[52] U.S. Cl. ................................. 356/372; 356/397
[58] Field of Search .................................. 356/372, 373, 356/375, 394, 397, 384–387; 382/142; 348/87, 126

[56] References Cited

U.S. PATENT DOCUMENTS

| 2,650,518 | 9/1953 | Jaroff et al. | 356/397 |
| 4,172,662 | 10/1979 | Vogel | 356/397 |
| 4,269,515 | 5/1981 | Altman | 356/394 |
| 4,393,401 | 7/1983 | Gorenflo et al. | 356/397 |

FOREIGN PATENT DOCUMENTS

| 3323836 | 1/1985 | Germany . |
| 1116402 | 5/1989 | Japan . |
| WO 90/09559 | 8/1990 | WIPO . |

Primary Examiner—Hoa Q. Pham
Attorney, Agent, or Firm—Rogers & Killeen

[57] ABSTRACT

A scale has marks of a point-symmetrical shape which are arranged in matrix. The scale and an article to be measured in dimension are positioned without any relative movement. An image sensor unit detects a predetermined portion of the article and the marks of the scale corresponding to the predetermined portion of the article selectively and successively, and the image sensor unit generates output signals in accordance with the detected results of the article and the scale. The output signals are processed to calculate the dimension of the article.

12 Claims, 5 Drawing Sheets

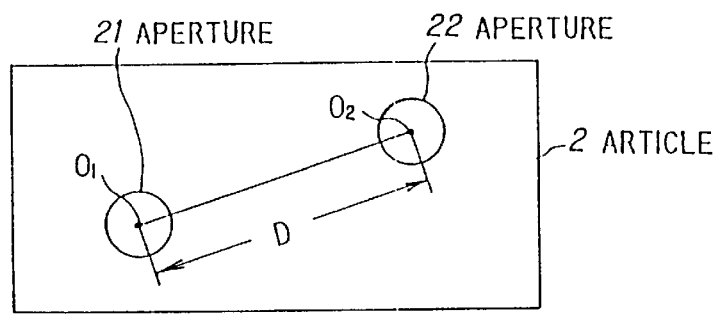
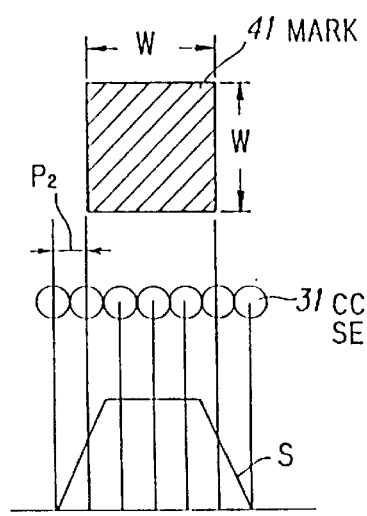 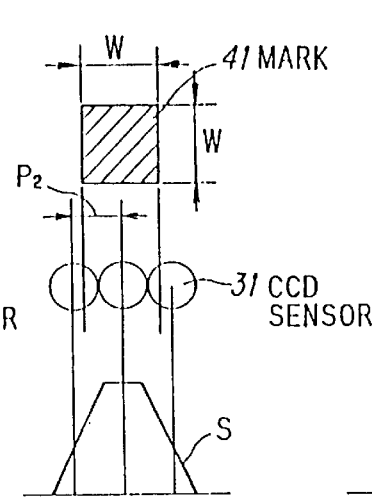 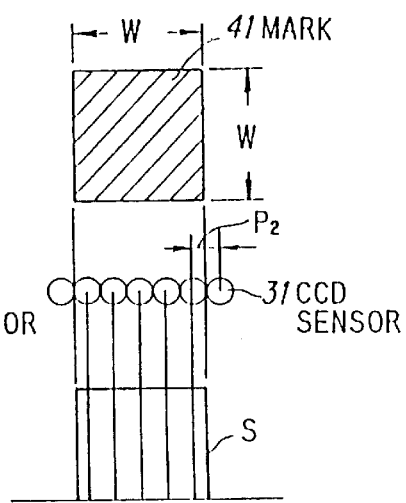

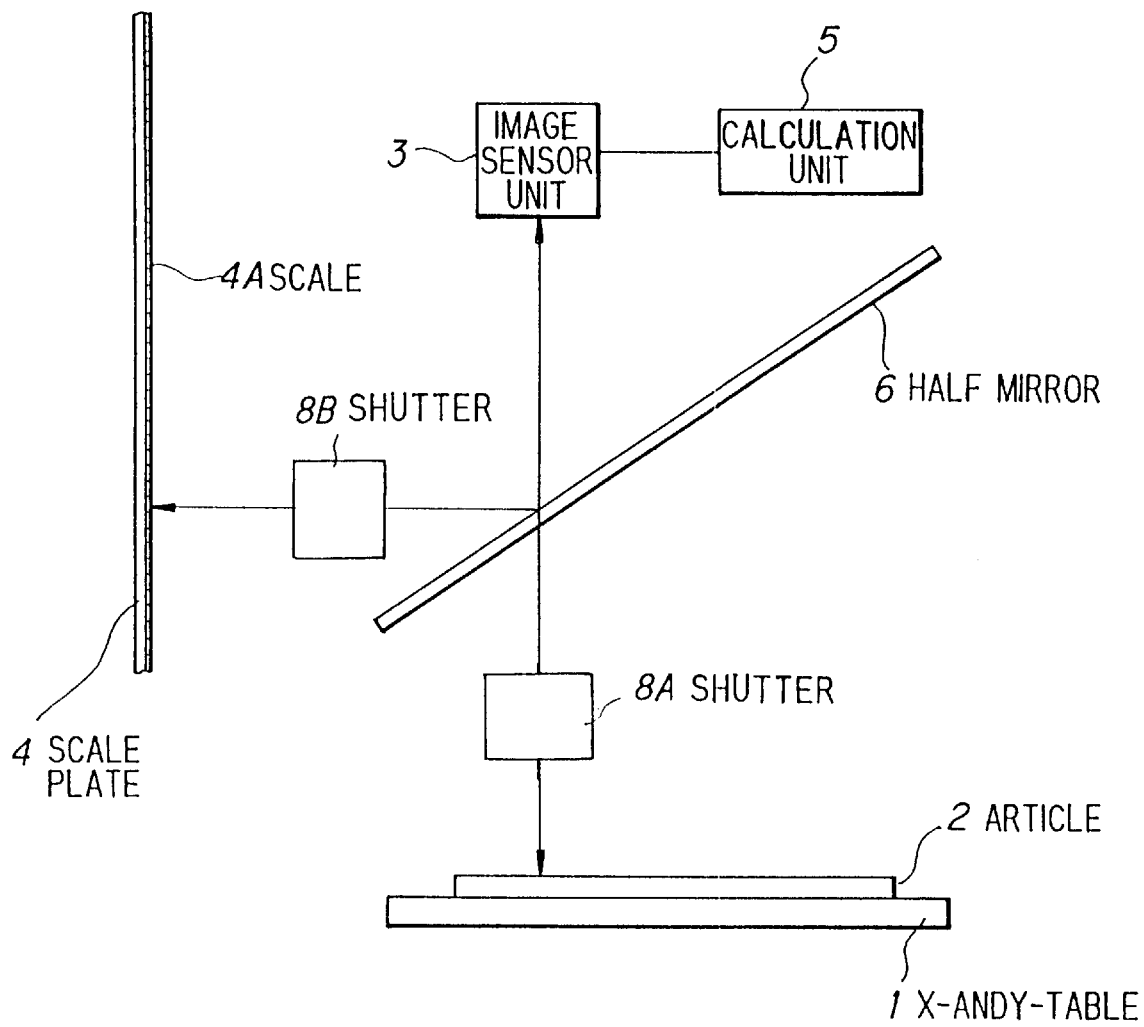

APPARATUS FOR MEASURING DIMENSION OF ARTICLE AND SCALE TO BE USED IN THE SAME This application is a Continuation of U.S. application Ser. No. 08/453,525, May 30, 1995, now abandoned.

FIELD OF THE INVENTION

The invention relates to an apparatus for measuring dimension, angle, distance, size etc. (defined "dimension" simply hereinafter) of an article and a scale to be used in the same, and more particularly to, an apparatus for improving precision in measuring dimension of an article regardless of a portion of the article to be measured and a scale to be used in the same.

BACKGROUND OF THE INVENTION

A conventional apparatus for measuring dimension of an article is described in the Japanese Patent Publication No. 5-85004 published on Dec. 6, 1993. The conventional apparatus for measuring dimension of an article comprises X- and Y-transparent scale plates having marks for scales, a mount plate for placing a rectangular sheet article to be measured thereon, a light equipment for radiating light to the article placed on the transparent scale plates, and X-, Y- and origin image sensors for receiving light transmitted through the X- and Y-transparent scale plates.

In operation, the rectangular sheet article is placed on the mount plate, such that first and second orthogonal sides of the rectangular sheet article are positioned on inner portions of the X- and Y-transparent scale plates, and a vertex defined by the first and second orthogonal sides is positioned on an inner portion of a crossing area of the X- and Y-transparent scale plates. Then, light is radiated from the light equipment to the X- and Y-transparent scale plates, so that light transmitted through outer portions of the X- and Y-transparent scale plates and an outer portion of the crossing area is received by X-, Y- and origin image sensors. In accordance with output signals of the X-, Y- and origin image sensors, a position of the vertex defined by the first and second orthogonal sides of the rectangular sheet article, and positions of two other vertexes defined by the second side and a third side of the rectangular sheet article, and by the first side and a fourth side of the rectangular sheet article are determined relative to the scales of the X- and Y-transparent scale plates. Consequently, lengths of the first to fourth sides of the rectangular sheet article, lengths of diagonal lines of the rectangular sheet article and vertex angles of the rectangular sheet article are obtained in accordance with the calculation of using the positions of the three vertexes of the rectangular sheet article.

In the conventional apparatus for measuring dimension of an article, however, there are disadvantages in that, for instance, a distance between two arbitrary points on the rectangular sheet article is impossible to be measured, because the positions of the vertexes are detected by using the X- and Y-transparent scale plates, and any pattern defined on the rectangular sheet article can not be measured, even if the pattern is positioned in the vicinity of the first and second sides, because each of the X- and Y-image sensors can not discriminate the pattern from the marks for the scales due to the structure in which the rectangular sheet article is positioned directly on the X- and Y-scale plates.

SUMMARY OF THE INVENTION

Accordingly, it is an object of the invention to provide an apparatus for measuring dimension of an article in which a distance between two arbitrary points on an article can be measured, even if the two points are far from, or off sides or edges of the article, and a scale to be used in the same.

It is a further object of the invention to provide an apparatus for measuring dimension of an article in which marks for a scale and a pattern defined on the article are precisely discriminated from the others to increase precision in measuring the dimension of the article, and a scale to be used in the same.

According to the feature of the invention, an apparatus for measuring dimension of an article, comprises:

a table for placing an article to be measured in dimension thereon;

a scale having marks arranged in matrix;

means for commonly moving the table and the scale;

an image sensor unit for selectively detecting a portion of the article and the marks of the scale corresponding to the portion of the article;

means for providing a relative movement between the table and the image sensor unit; and a calculation unit for calculating the dimension of the article in accordance with output signals of the image sensor unit.

According to another feature of the invention, a scale to be used in an apparatus for measuring dimension of an article, comprises:

a scale substrate;

marks arranged in matrix on the scale substrate, each of the marks having a width of W and a height of W, and being arranged by a pitch of $P_1$, and each of the marks being of a point-symmetrical shape, wherein the marks meet conditions as defined below, $$2P_1 - W < V,$$
$$W < P_1/2, \text{ and}$$
$$2P_2 \leq W$$

where V is a view area of an image sensor unit to detect the scale, and $P_2$ is a pitch of matrix-arranged sensors of the image sensor unit.

BRIEF DESCRIPTION OF THE DRAWINGS

The invention will be explained in more detail in conjunction with appended drawings, wherein;

FIGS. 1A to 1H are explanatory diagrams showing an apparatus for measuring dimension of an article in a first preferred embodiment according to the invention, in which FIG. 1A shows the apparatus, FIG. 1B shows a scale used in the apparatus, FIG. 1C shows marks for the scale, FIG. 1D shows an image sensor unit used in the apparatus, FIG. 1E shows an article to be measured in the apparatus, and FIGS. 1F and 1H show the relation of CCD sensors of the image sensor unit to a mark of the scale in the apparatus, and FIGS. 2 to 4 are explanatory diagrams showing apparatuses for measuring dimension of an article in second to fourth preferred embodiments according to the invention.

DESCRIPTION OF THE PREFERRED EMBODIMENTS

An apparatus for measuring dimension of an article in the first preferred embodiment according to the invention will be explained in FIGS. 1A to 1H.

Figure 1A:
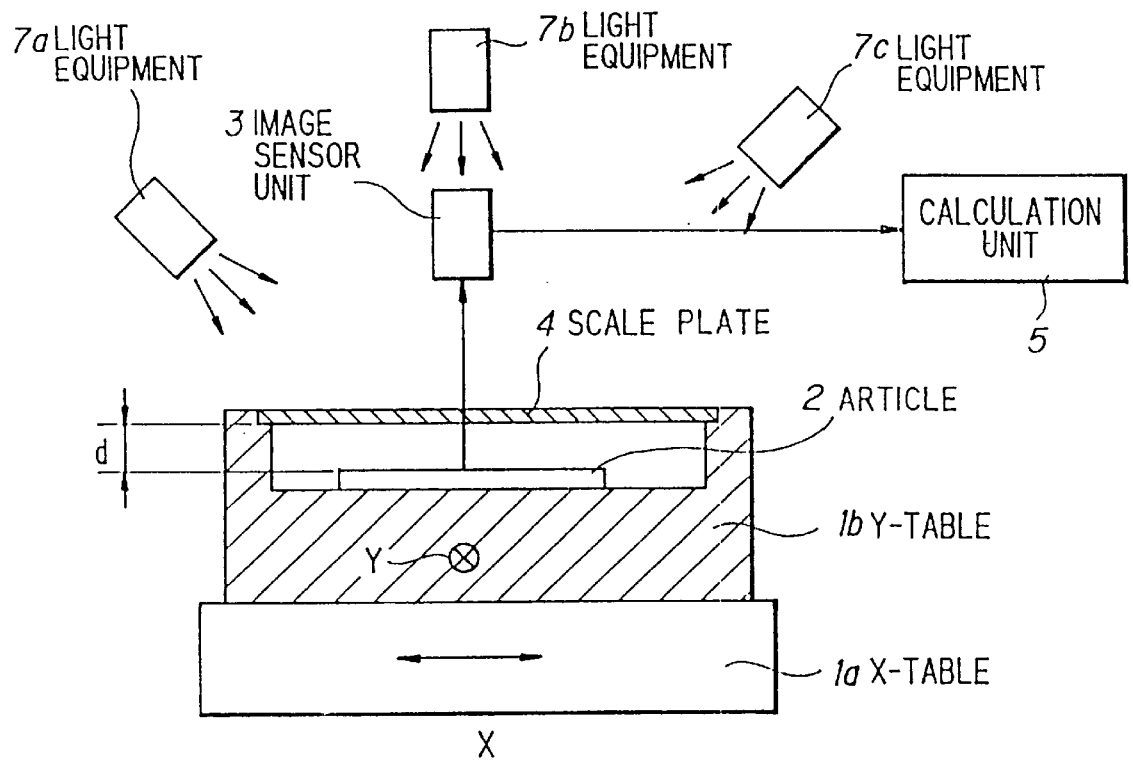

In FIG. 1A, the apparatus comprises an X-table 1a moving in the X-direction indicated by an arrow, a Y-table 1b moving in the Y-direction orthogonal to the X-direction, on which an article 2 is placed to be measured in dimension, a transparent scale plate 4 provided on the Y-table 1b to have a scale on one surface thereof, an image sensor unit 3 having a focusing system (not shown) to be focused on the article 2 and the scale of the scale plate 4 selectively, a calculation unit 5 for calculating dimension of the article 2 by receiving output signals of the image sensor unit 3, and light equipments 7a, 7b and 7c for directing light through the scale plate to the article 2.

In the apparatus, the Y-table 1b and the scale plate 4 are designed, such that the article 2 is placed on the Y-table 1b to have a distance d greater than a focus depth of the following system of the image sensor unit 3 from the scale plate 4.

Figure 1B:
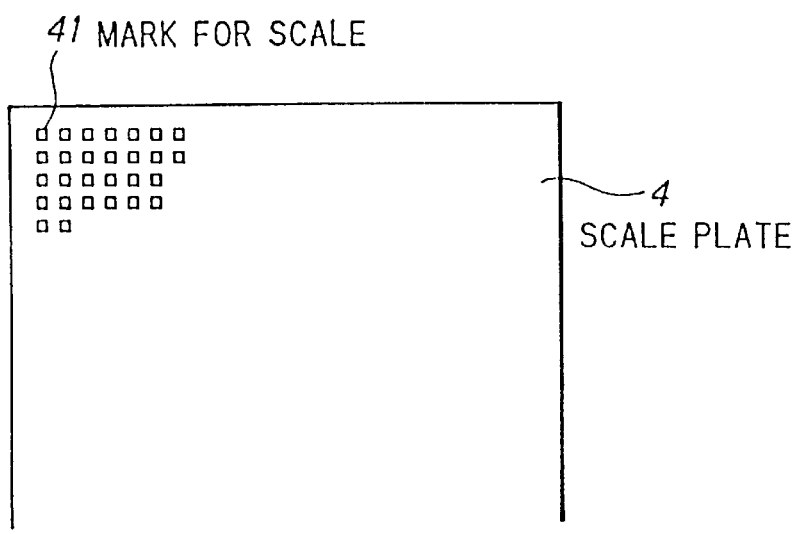

FIG. 1B shows the transparent scale plate 4 having marks 41 for the scale arranged in matrix.

Figure 1C:
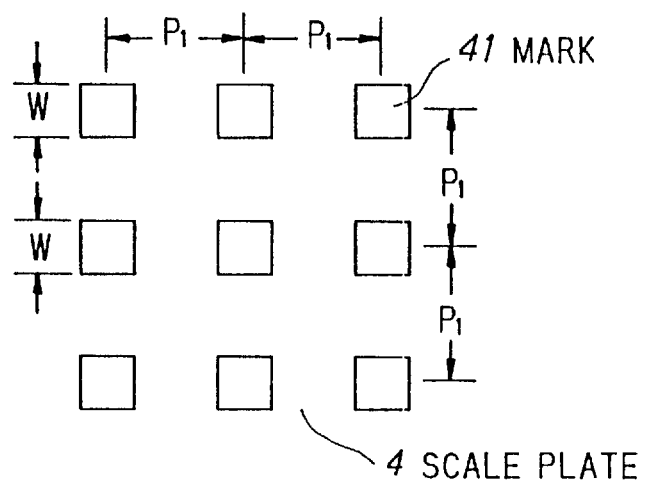

In FIG. 1C, the marks 41 which are enlarged are of a width W and a height W, and arrayed by a pitch $P_1$.

Figure 1D:
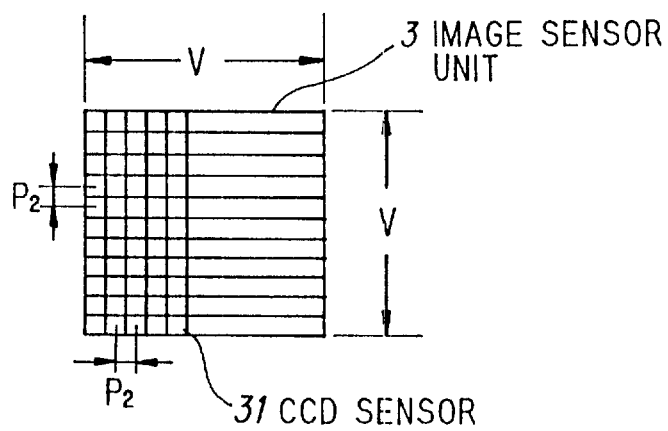

FIG. 1D shows a view area V×V on the marks 41 of the scale plate 4 or the article 2 covered by CCD sensors 31 of the image sensor unit 3, wherein the CCD sensors 31 are arranged in matrix by a pitch $P_2$.

FIG. 1E shows the article 2 of, for instance, a metal plate having apertures 21 and 22 formed by a distance D between the central points $O_1$ and $O_2$ thereof.

In FIGS. 1F to 1H, the CCD sensors 31 of the image sensor unit 3 detect the mark 41 of the scale plate 4, so that a detected signal S is supplied to the calculation unit 5, wherein a waveform of the output signal S depends on the relation between the width W of the mark 41 and the pitch $P_1$ of the CCD sensors 31 of the image sensor unit 3, and the relative position of the CCD sensors 31 to the mark 41.

In order to locate a specific one of the marks 41 having the same size and configuration, the conditions must be met as set out below.

$$M < P_1/2 \quad (1)$$

where M is an appropriate position precision of the X- and Y-tables 1a and 1b, even if a scale other than one used in the invention is used.

$$2P_1 + W < V, \quad (2)$$

This means that more than two marks 41 must be covered in the X- and -directions by the image sensor unit 3.

$$W < P_1/2 \quad (3)$$

This means that a ratio of the pitch $P_1$ to the width W must be less than two, so that the influence of the article 2 to an image of the marks 41, that is the deterioration of resolution is suppressed to be low.

$$2P_2 \leq W \quad (4)$$

This means that the width W must be larger relative to the pitch $P_2$ of the CCD sensors 31 by a predetermined value, that is, two times. Consequently, the central point of each mark 41 is precisely obtained in accordance with the processing of the output signals S. The relation as shown in FIG. 1G does not meet the above condition to generate the output signal S which is of a pulse-like waveform, while the relations as shown in FIGS. 1F and 1H meet the above condition to provide the output signals S which are of a step-shaped waveform.

The step-shaped waveform is advantageous in processing the output signals S, and discriminating dust on the scale-plate 4 from the marks 41.

In measuring dimension of the article 2, the calculation unit 5 uses the central points of the marks 41. Therefore, the width W of the marks 41 is permissible to have deviation, because the central points thereof are not deviated due to the structure in which the marks 41 are square to be symmetrical in regard to the central points.

In this sense, the marks 41 are not limited to be square, but point-symmetrical shapes such as circle, etc.

As discussed above, one specific optimum example is as follows.

W=80 µm, $P_1$=400 µm, V=1000 µm, M=100 µm, and $P_1$=2 µm.

As described in FIG. 1A, the article 2 is separated on optical axis from the marks 41 of the scale plate 4 by the predetermined distance preferably largely greater than the focus depth.

In one specific example, d=5 to 10 mm, when the focus depth of the focusing system of the image sensor unit 3 is 14 µm.

In operation, the X- and Y-tables 1a and 1b are controlled successively to move in the X- and Y-directions, respectively, so that the aperture 21 of the article 2 is positioned below the image sensor unit 3. At this state, the aperture 21 and the marks 41 of the scale plate 4 covering the aperture 21 are focused separately by the focusing system of the image sensor unit 3. Thus, the aperture 21 and the marks 41 are detected separately by the CCD sensors 31 of the image sensor unit 3, so that output signals S are supplied therefrom to the calculation unit 6, in which the central point $O_1$ of the aperture 21 is calculated in accordance with addresses of the marks 41. Then, the X- and Y-tables 1a and 1b are moved in the X- and Y-directions, respectively, so that the aperture 22 of the article 2 is positioned below the image sensor unit 3. In the same manner as in the aperture 21, the central point $O_1$ of the aperture 22 is calculated in accordance with addresses of the marks 41 in the calculation unit 5.

Then, the distance D between the central points $O_1$ and $O_2$ of the apertures 21 and 22 is calculated in accordance with the calculated positions thereof in the calculation unit 5.

In an apparatus for measuring dimension of an article in the invention, an image sensor unit 3 may be moved in the X- and Y-directions, while an article 2 and a scale may be stationary, and a magnetical detecting system may be adopted in place of the optical detecting system as adopted above.

Figure 2:
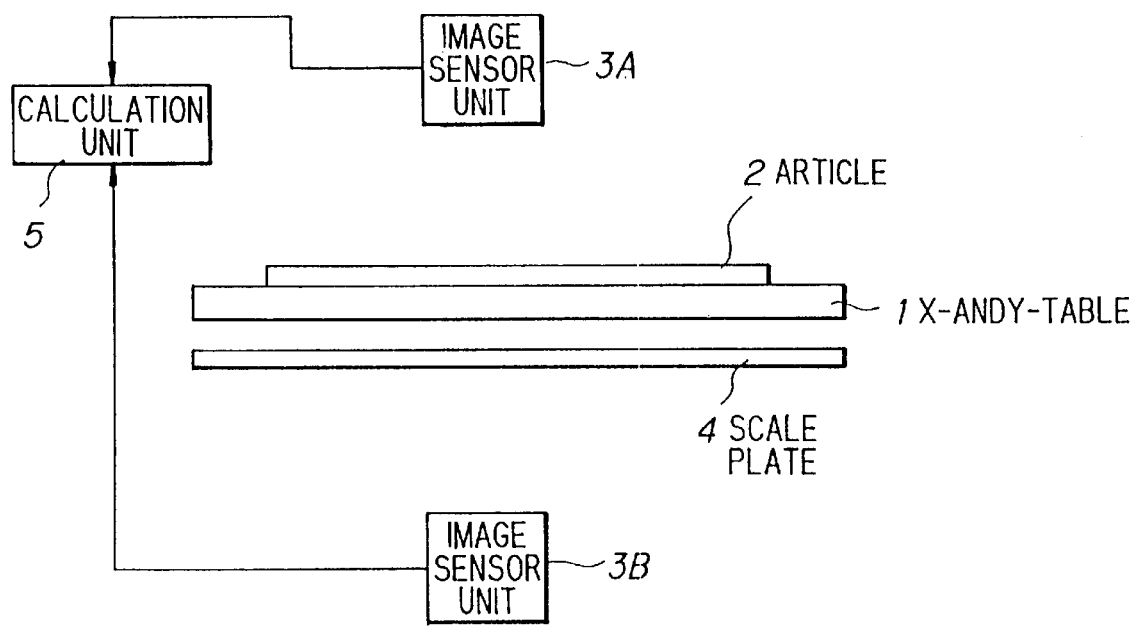

FIG. 2 shows an apparatus for measuring dimension of an article in the second preferred embodiment according to the invention, wherein like parts are indicated by like reference numerals as used in the first preferred embodiment, provided that the scale plate 4 having the marks for the scale is provided on the opposite side to the article 2.

In the apparatus, the X- and Y-tables are simply shown by a table 1, and the image sensor unit 3 as shown in FIG. 1A is replaced by image sensor units 3A and 3B which are provided at the same positions on the opposite sides relative to the table 1.

In operation, the article 2 and the scale plate 4 are moved to take the same positions relative to the image sensor units 3A and 3B in accordance with the X- and Y-movements of the table 1. Thus, output signals of the image sensor units 3A and 3B are supplied to the calculation unit 5, in which the output signals are processed to calculate dimension of the article 2.

Figure 3:
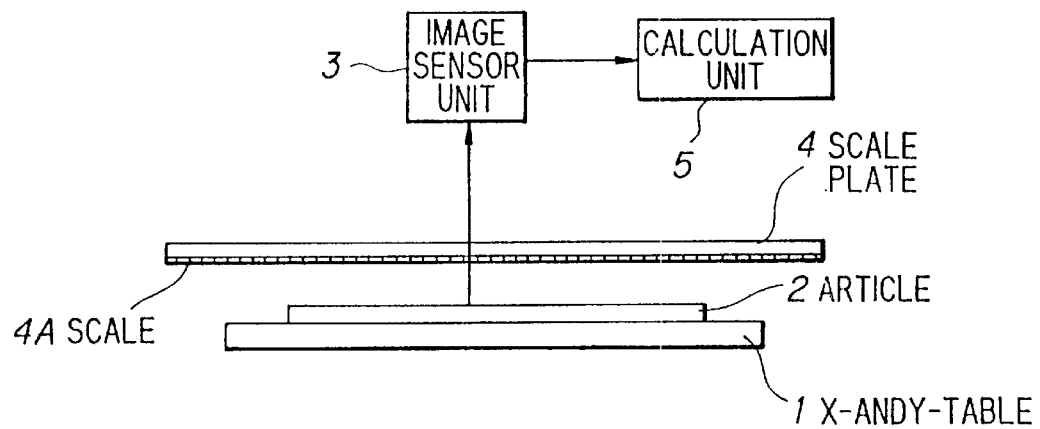

FIG. 3 shows an apparatus for measuring dimension of an article in the third preferred embodiment according to the invention, wherein like parts are indicated by like reference numerals as used in the first and second preferred embodiments.

In the apparatus, the scale plate 4 has the scale 4A on the surface facing the article 2 to increase precision in measuring dimension of the article 2 for the reason why both the article 2 and the scale 4A are detected through the scale plate 4 by the image sensor unit 3, so that the influence of a refractive index of the scale plate 4 is commonly applied to the detecting lights of the article 2 and the scale 4A.

FIG. 4 shows an apparatus for measuring dimension of an article in the fourth preferred embodiment according to the invention, wherein like parts are indicated by like reference numerals as used in the first to third preferred embodiments.

In the apparatus, a half mirror 6 is provided at an angle of 45° relative to the X- and Y-table 1 and the scale table 4 having the scale 4A, and shutters 8A and 8B are provided to shut one of light paths for the scale 4A and the article 2. The shutters 8A and 8B may be omitted when other means such as using different wavelengths of lights for the scale 4A and the article 2 is adopted.

In operation, a predetermined portion of the article 2 and the relevant marks of the scale 4A are selectively detected in accordance with the switch-over of the shutters 8A and 8B by the image sensor unit 3.

In the second and fourth preferred embodiments, optical distances can be equal to decrease error.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An apparatus for measuring dimension of an article, comprising:
    a table for placing an article to be measured in dimension thereon;
    a scale having marks arranged in matrix;
    means for commonly moving said table and said scale;
    an image sensor unit for selectively detecting a portion of said article and said marks of said scale corresponding to said portion of said article, said scale being positioned between said image sensor and the article so that said image sensor uses said marks of said scale to measure a distance between any portions of the article;
    means for providing a relative movement between said table and said image sensor unit; and
    a calculation unit for calculating said dimension of said article in accordance with output signals from said image sensor unit.

2. The apparatus as defined in claim 1, wherein:
    said table comprises X- and Y-tables moving in X- and Y-directions, said article being placed on one of said X- and Y-tables;
    said commonly moving means is means for fixing said scale to said one of said X- and Y-tables, said article and said scale having a predetermined distance therebetween on a light axis of said image sensor unit;
    said image sensor unit comprises a lens system having a focus depth, said predetermined distance being greater than said focus depth; and
    said providing means comprises means for fixing said image sensor unit to be stationary, and means for driving said X- and Y-tables to be moved in said X- and Y-directions.

3. The apparatus as defined in claim 1, wherein:
    said table comprises X- and Y-tables moving in X- and Y-directions, said article being placed on one of said X- and Y-tables;
    said commonly moving means is means for conveying motions in said X- and Y-directions to said scale, said scale being provided on an opposite side of said table to said article;
    said image sensor unit comprises a first image sensor unit for detecting said portion of said article, and a second image sensor unit for detecting said marks of said scale corresponding thereto; and
    said providing means comprises means for fixing said first and second image sensor units to be stationary, and means for driving said X- and Y-tables to be moved in said X- and Y-directions.

4. The apparatus as defined in claim 1, wherein:
    said scale is provided on a first surface of a scale plate, said first surface of said scale plate being on a side of said article.

5. The apparatus of claim 1 wherein said scale is spaced a predetermined distance from said article along a light axis of said image sensor unit, and wherein said image sensor unit has a focus depth less than said predetermined distance so that said image sensor unit is able to focus on one or the other of said scale and said article, but not both at the same time.

6. The apparatus of claim 5 wherein the light axis of said image sensor unit is generally perpendicular to said scale and wherein said scale is closer than said article to said image sensor unit.

7. The apparatus of claim 6 wherein said table comprises a movable platform for carrying said article and wherein said scale is affixed to said movable platform said predetermined distance from said article, whereby said portion of said article can be moved to the light axis of said image sensor unit.

8. The apparatus of claim 1 wherein said image sensor unit comprises a plurality of CCD sensors, each for detecting an area smaller than one of said marks.

9. The apparatus of claim 8 further comprising a movable table for carrying said platform, and wherein said platform is movable relative to said table, and wherein said table and said platform are movable relative to said image sensor unit.

10. An apparatus for measuring dimension of an article, comprising:
    X- and Y-tables moving in X- and Y-directions, said article being placed on one of said X- and Y-tables;
    a scale having marks arranged in matrix, said scale being arranged at an angle of 90° relative to the X- and Y-tables;
    an image sensor unit for selectively detecting a portion of said article and said marks of said scale corresponding to said portion of said article;

a half mirror arranged at an angle of 45° relative to said scale and said article;

means for providing a relative movement between said table and said image sensor unit; and a calculation unit for calculating said dimension of said article in accordance with output signals of said image sensor unit.

11. An apparatus for measuring a dimension of an article comprising:

a platform for carrying an article to be measured;

a transparent scale having plural marks in a matrix thereon, said scale being fixed relative to said platform;

an image sensor unit having a light axis extending through said scale to a portion of the article for detecting the portion of the article and for detecting ones of said marks adjacent said light axis, one of said image sensor unit and said platform being movable relative to the other;

wherein said scale is spaced a predetermined distance from the article along the light axis of said image sensor unit;

wherein said image sensor unit has a focus depth less than said predetermined distance so that said image sensor unit is able to focus on one or the other of said scale and the article, but not both at the same time; and a calculation unit for receiving signals from said image sensor unit identifying the ones of said marks adjacent at least two of the detected portions which are related to the dimension to be measured and for calculating the dimension from the signals.

12. The apparatus of claim 11 wherein said predetermined distance is from 5 to 10 mm and wherein said focus depth is from 3 to 14 $\mu$m.

* * * * *